United States Patent
Roberts et al.

(10) Patent No.: US 9,137,560 B2
(45) Date of Patent: Sep. 15, 2015

(54) METHODS AND SYSTEMS FOR PROVIDING ACCESS TO CONTENT DURING A PRESENTATION OF A MEDIA CONTENT INSTANCE

(75) Inventors: Brian F. Roberts, Dallas, TX (US); Donald H. Relyea, Dallas, TX (US); Raul I. Aldrey, Plano, TX (US); Kishore Tallapaneni, Flower Mound, TX (US); Japan A. Mehta, Coppell, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 830 days.

(21) Appl. No.: 12/964,958

(22) Filed: Dec. 10, 2010

(65) Prior Publication Data

US 2012/0147022 A1    Jun. 14, 2012

(51) Int. Cl.
*H04N 21/41* (2011.01)
*H04N 21/422* (2011.01)

(52) U.S. Cl.
CPC ....... *H04N 21/4126* (2013.01); *H04N 21/4222* (2013.01); *H04N 21/42222* (2013.01)

(58) Field of Classification Search
USPC .................................. 725/13, 80, 133, 141
See application file for complete search history.

(56) References Cited

U.S. PATENT DOCUMENTS

| | | | |
|---|---|---|---|
| 2006/0218618 A1* | 9/2006 | Lorkovic | 725/135 |
| 2007/0033622 A1* | 2/2007 | Kim et al. | 725/87 |
| 2007/0266409 A1* | 11/2007 | Hsu | 725/78 |
| 2009/0049475 A1* | 2/2009 | Green et al. | 725/44 |
| 2009/0158326 A1* | 6/2009 | Hunt et al. | 725/38 |
| 2009/0222874 A1* | 9/2009 | White et al. | 725/118 |
| 2009/0271829 A1* | 10/2009 | Larsson et al. | 725/82 |
| 2011/0090407 A1* | 4/2011 | Friedman | 348/734 |
| 2012/0057081 A1* | 3/2012 | Petersson et al. | 348/734 |

* cited by examiner

*Primary Examiner* — Ricky Chin

(57) ABSTRACT

Exemplary methods and systems for providing access to content during the presentation of a media content instance are disclosed herein. As described in more detail below, a content presentation system may detect a predefined motion of a mobile device during a presentation of a media content instance by a media content access device, identify the media content instance, and provide access to the identified media content instance by way of the mobile device in response to the predefined motion. Corresponding methods and systems are also disclosed.

24 Claims, 8 Drawing Sheets

METHODS AND SYSTEMS FOR PROVIDING ACCESS TO CONTENT DURING A PRESENTATION OF A MEDIA CONTENT INSTANCE

BACKGROUND INFORMATION

Advances in electronic communications technologies have interconnected people and allowed for distribution of information perhaps better than ever before. To illustrate, personal computers, handheld devices, mobile phones, set-top box devices, and other electronic access devices are increasingly being used to access, store, download, share, and/or otherwise process various types of media content (e.g., video, audio, photographs, and/or multimedia).

Many users of such devices would be interested in transferring a presentation of media content from one access device to another. For example, a user who has viewed a first portion of a movie using a set-top-box device may be interested in transferring the presentation of the movie to a mobile device so that the user can view the remaining portion of the movie on the mobile device. Unfortunately, traditional systems do not provide a user with the ability to conveniently transfer media content between devices. Rather, the transfer processes of traditional systems may be burdensome and/or unintuitive for the user and may require the user to incur additional cost to access the movie using the mobile device.

In addition, many users would be interested in accessing enhanced content associated with a media content instance while the media content instance is being presented by way of one of the above-mentioned access devices if given the opportunity to do so. For example, many users would enjoy accessing additional information associated with a particular scene in a television program, purchasing items similar to those included in the television program, and/or discovering additional media content featuring various characters included in the television program while the television program is being presented. In current implementations, the user must provide substantial user input (e.g., enter one or more keywords into a search engine, navigate to a website associated with the media content instance, etc.) in order to access such enhanced content. This is cumbersome, distracting, and difficult to perform for many users while they watch or otherwise experience the media content instance. Hence, many users do not even attempt to access enhanced content associated with a media content instance while the media content instance is being presented.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
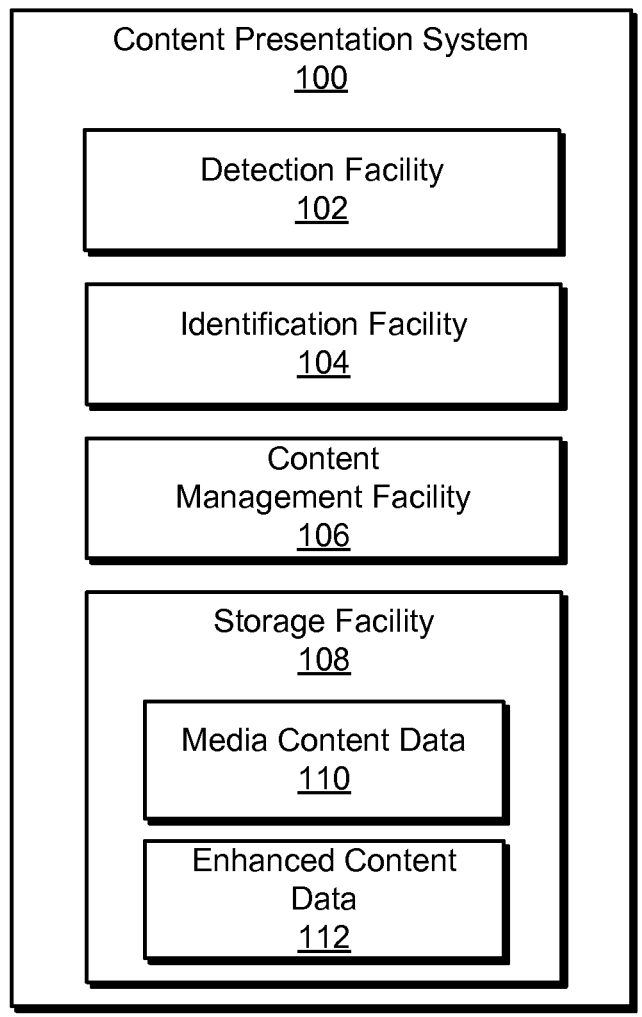
FIG. 1 illustrates an exemplary content presentation system according to principles described herein.

Exemplary methods and systems for providing access to content during the presentation of a media content instance are disclosed herein. As described in more detail below, an exemplary method may include a content presentation system detecting a predefined motion of a mobile device during a presentation of a media content instance by a media content access device, identifying the media content instance, and providing access to the identified media content instance by way of the mobile device in response to the predefined motion. In this or a similar manner, the exemplary systems and methods described herein may allow a user to transfer the presentation of a media content instance (e.g., a movie) from a media content access device (e.g., a set-top box device) to a mobile device (e.g., a tablet computer, a mobile phone device, etc.). Additional or alternative methods and systems for providing access to content during the presentation of a media content instance are also disclosed herein.

As will be described in more detail below, the methods and systems disclosed herein may be configured to allow a user to dynamically access and/or transfer content during the presentation of a media content instance by a media content access device. To illustrate, a user may utilize the methods and systems disclosed herein to transfer a presentation of a movie from the user's set-top box device to a mobile device, thereby allowing the user to continue viewing the movie using the mobile device. As a result, a user's viewing experience of the movie may not necessarily be limited to a single physical location and/or a single media content access device. Additionally or alternatively, the methods and systems disclosed herein may allow a user to access, by way of the mobile device, enhanced content associated with the movie during the presentation of the movie by the set-top box device. Additional benefits and advantages will be apparent from the details disclosed herein.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

The term "metadata" as used herein refers generally to any electronic data descriptive of media content and/or media content instances. Hence, metadata may include, but is not limited to, time data, physical location data, user data, source data, program guide data, destination data, size data, creation data, modification data, access data (e.g., play counts), and/or any other data descriptive of content and/or one or more media content instances. For example, metadata corresponding to a song may include a title of the song, a name of the song's artist or composer, a name of the song's album, a genre of the song, a length of the song, a rating of the song, one or more graphics corresponding to the song (e.g., album art), and/or any other information corresponding to the song as may serve a particular application. Metadata corresponding to a video may include a title of the video (e.g., a television program, a movie, etc.), a name of one or more people associated with the video (e.g., actors, directors, producers, creators, etc.), a rating of the video (e.g., user ratings, critic ratings, etc.), a synopsis of the video, a setting of the video, a theme of the video, a format of the video, a quality (e.g., resolution) of the video, a size of the video, a time or date associated with the video (e.g., time or date of production, time or date of release, etc.), a color content of the video, a bit-rate of the video, a compression amount of the video, a codec associated with the video, and/or any other information corresponding to the video as may serve a particular application. Metadata corresponding to an image (e.g., a photograph) may include a description of the image, a location associated with the image, a name of one or more persons associated with the image (e.g., one or more persons appearing in the image, a person that created the image, a copyright owner of the image, etc.), a size of the image, a format of the image, a quality of the image, and/or any other information corresponding to the image. Metadata corresponding to other types of media content instances may include additional or alternative information.

As used herein, the terms "enhanced content" and "enhanced content instance" may include any content related to a particular media content instance being presented. For example, an enhanced content instance may include, but is not limited to, an advertisement, interactive content, a communication (e.g., a communication provided by way of a social media outlet), a video (e.g., a trailer, a video clip, etc.), an article (e.g., an online newspaper article), music, a map, a web page, a web-based search results list (e.g., a Google search results list), and/or any other content as may serve a particular implementation.

Enhanced content instances may be obtained from one or more enhanced content sources. For example, enhanced content instances may be obtained from social media sources (e.g., Facebook, Twitter, YouTube, blogs, Wikipedia, etc.), media content sources (e.g., iTunes, Netflix, etc.), retail product sources (e.g., Wal-Mart, Borders, Amazon, etc.), advertisement sources (e.g., retailers), Internet search engines (e.g., Google, Bing, etc.), news sources (e.g., CNN, Wall Street Journal, etc.), and/or any other suitable enhanced content source.

FIG. 1 illustrates an exemplary content presentation system 100 (or simply "system 100"). As will be described in more detail below, system 100 may be configured to facilitate access to and/or the presentation of content (e.g., media content and/or enhanced content) during the presentation of a media content instance.

System 100 may include, but is not limited to, a detection facility 102, an identification facility 104, a content management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Detection facility 102 may be configured to detect a predefined user input provided by way of a mobile device during a presentation of a media content instance by a separate media content access device. As will be explained in more detail below, in response to the detection of the predefined user input by detection facility 102, system 100 may be configured to provide the corresponding mobile device with access to the media content instance being presented and/or to enhanced content associated with the media content instance being presented.

The predefined user input may include any suitable user input or combination of user inputs. In some examples, the predefined user input may include, and detection facility 102 may be configured to detect, a predefined motion of the mobile device. For example, the predefined motion may comprise any suitable motion or combination of motions of the mobile device (e.g., as caused by a user of the mobile device). In some examples, the predefined motion may be a "scooping" motion, thereby providing a user with the sensation of scooping up content from the media content access device onto the mobile device. In further examples, the predefined motion may be any other suitable motion (e.g., a waving motion, a swiping motion, a tossing motion, a throwing motion, a flicking motion, etc.) as may serve a particular implementation. In some examples, the predefined motion may be user configurable. For example, a user may configure (e.g., train) detection facility 102 to detect any desired user-defined motion.

In additional or alternative examples, the predefined user input may be any other suitable user input as may serve a particular implementation. For example, the predefined user input may include a predefined user selection of an option provided by way of the mobile device. To illustrate, the predefined user input may include a user's selection of an option displayed on a display screen of a mobile device.

Detection facility 102 may be configured to detect the predefined user input in any suitable manner. For example, detection facility 102 may be configured to utilize and/or communicate with one or more motion sensors (e.g., one or more accelerometers and/or one or more gyroscopes included in the mobile device) to detect a predefined motion of the mobile device. Additionally or alternatively, detection facility 102 may be configured to detect a predefined user input provided by way of a touch screen or other suitable input mechanism (e.g., a button) associated with the mobile device.

In some examples, detection facility 102 may be configured to detect multiple distinct predefined user inputs. For example, detection facility 102 may be configured to detect a first predefined user input provided by way of a mobile device (e.g., a first predefined motion of the mobile device) and a second predefined user input provided by way of the mobile device (e.g., a second predefined motion of the mobile device). In certain embodiments, each predefined user input may be associated with a particular result. For example, in response to a first predefined user input, system 100 may be configured to provide a mobile device with access to a first type of content (e.g., media content) and in response to a second predefined user input, system 100 may be configured to provide the mobile device with access to a second type of content (e.g., enhanced content). Additionally or alternatively, in response to a first predefined user input, system 100 may be configured to provide the mobile device with access to a media content instance being presented by a first media content access device or to enhanced content associated with the media content instance being presented by the first media content access device. Thereafter, in response to a second predefined user input, system 100 may be configured to provide a second media content access device with access to the media content instance or enhanced content. To illustrate, a user watching a movie by way of a first television device and/or a first set-top box device may utilize a first predefined motion of a mobile device (e.g., a scooping motion in the general direction and/or proximity of the first television/set-top box device) to transfer the presentation of the movie from the first television/set-top box device to the mobile device. As a result, the user can continue viewing the movie on the mobile device and/or at a different location. Thereafter, the user may utilize a second predefined motion of the mobile device (e.g., a throwing motion) to transfer the presentation of the movie back to the first television/set-top box device or to another media content access device (e.g., a second television device and/or a second set-top box device located in another room in the user's home). In additional or alternative examples, detection facility 102 may be configured to detect any suitable number of distinct predefined user inputs.

In some examples, detection facility 102 may be configured to detect that the predefined user input is directed towards and/or associated with one or more depictions within a three-dimensional ("3D") display of a media content instance. For example, detection facility 102 may be configured to detect that a predefined motion of the mobile device is directed towards a particular person or other object displayed within a 3D display of a media content instance. To illustrate, a user viewing a movie in 3D may utilize a mobile phone device to "scoop" up a 3D depiction of a particular person displayed in the movie to access content associated with the particular person by way of the mobile phone device. Detection facility 102 may be configured to utilize any suitable 3D technologies, stereoscopic technologies, spatial positioning technologies, spatial imaging technologies, and/or any other suitable technologies to detect that the predefined user input is directed and/or associated with one or more objects depicted within a 3D display of a media content instance.

In certain embodiments, detection facility 102 may be configured to detect a time associated with the predefined user input. For example, detection facility 102 may be configured to detect when a predefined user input is provided as it relates to the presentation of a media content instance. To illustrate, detection facility 102 may be configured to detect a presentation position or playback position of the media content instance associated with when the predefined user input was provided. The detected presentation position of the media content instance may be utilized by system 100 to determine where to begin/resume a presentation of the media content instance by way of a corresponding mobile device. Additionally or alternatively, and as will be explained in more detail below, detection facility 102 may be configured to detect that the predefined user input is provided during a time period associated with an alert provided by system 100 indicating that a media content instance and/or associated enhanced content is available for access by a user.

Identification facility 104 may be configured to identify a media content instance and/or enhanced content associated with a media content instance. For example, identification facility 104 may be configured to identify a media content instance being presented by a media content access device and/or at least one enhanced content instance associated with the media content instance being presented, as will be explained in more detail below.

Identification facility 104 may be configured to identify a media content instance in any suitable manner. For example, identification facility 104 may be configured to identify the media content instance based on data and/or information associated with the media content instance. In some examples, identification facility 104 may be configured to utilize metadata associated with the media content instance to identify the media content instance. To illustrate, identification facility 104 may be configured to receive metadata associated with the media content instance from a media content access device (e.g., a set-top box device) presenting the media content instance, from a service provider associated with the media content instance, and/or from a third-party metadata provider (e.g., a third-party program guide information provider). After receiving the metadata associated with the media content instance being presented, identification facility 104 may be configured to utilize the received metadata to identify the media content instance and/or any other suitable information associated with the media content instance. For example, identification facility 104 may be configured to identify a title of the media content instance, a person associated with the media content instance (e.g., an actor, a singer, a producer, etc.), a genre of the media content instance, a length of the media content instance, a rating of the media content instance, a quality of the media content instance, a size of the media content instance, and/or any other suitable information associated with the media content instance.

As mentioned above, identification facility 104 may be further configured to identify enhanced content associated with a media content instance being presented. For example, identification facility 104 may be configured to identify one or more enhanced content instances associated with an identified media content instance. In some examples, identification facility 104 may be configured to identify the enhanced content instances based on information associated with the media content instance. For example, identification facility 104 may be configured to conduct one or more searches (e.g., parallel thread searches) of one or more enhanced content sources utilizing information identified by identification facility 104 based on the metadata and/or corresponding information associated with the media content instance.

The enhanced content identified by identification facility 104 may be associated with an identified media content instance in any suitable manner. For example, the enhanced content may be associated with the media content instance itself, with one or more persons (e.g., actors, news anchors, athletes, etc.) associated with the media content instance, one or more places (e.g., cities, countries, etc.) associated with the media content instance, one or more objects (e.g., advertised products, animals, cartoon characters, etc.) associated with the media content instance, one or more songs (e.g., songs from a corresponding soundtrack or artist) associated with the media content instance, one or more additional media content instances associated with the media content instance, and/or associated with the media content instance in any other suitable manner.

Identification facility 104 may be configured to identify a media content instance and/or associated enhanced content at any suitable time. For example, identification facility 104 may be configured to identify the media content instance and/or associated enhanced content prior to a presentation of the media content instance, during the presentation of the media content instance, and/or at any other suitable time. To illustrate, identification facility 104 may be configured to dynamically identify the media content instance and/or one or more associated enhanced content instances in real time during the presentation of the media content instance and/or in response to a predefined user input.

Identification facility 104 may be configured to inform a user when content is available for access by way of a mobile device. For example, identification facility 104 may be configured to provide a visual and/or audible alert to the user informing the user that a particular media content instance and/or a particular enhanced content instance is available for access by the user by way of a mobile device. In some examples, identification facility 104 may be configured to provide the alert by way of a media content access device presenting the media content instance and/or by way of the mobile device itself. In additional or alternative examples, identification facility 104 may be configured to inform the user that the content is available in any other suitable manner.

Management facility 106 may be configured to provide, in response to a predefined user input, access to an identified media content instance and/or associated enhanced content by way of a corresponding mobile device. For example, in response to a detection by detection facility 102 of a predefined user input provided by way of a mobile device during a presentation of a media content instance by a media content access device, and/or in accordance with an identification of the media content instance and/or associated enhanced content by identification facility 102, management facility 106 may be configured to provide the user with access to the media content instance and/or associated enhanced content by way of the mobile device.

Management facility 106 may be configured to provide access to an identified media content instance and/or corresponding enhanced content by way of a mobile device in any suitable manner. For example, management facility 106 may be configured to direct a media content access device presenting the media content instance and/or a service provider associated with the media content instance to transmit data (e.g., a file, a data stream, etc.) representative of the media content instance to the mobile device. Additionally or alternatively, management facility 106 may be configured to request and/or receive data representative of one or more enhanced content instances from one or more corresponding enhanced content sources.

In some examples, management facility 106 may be configured to transfer the presentation of the media content instance from the media content access device presenting the media content instance to the mobile device. For example, management facility 106 may be configured to direct the media content access device to discontinue the presentation of the media content instance and/or continue the presentation of the media content instance on the mobile device. To illustrate, after the presentation of a first portion of a movie by a set-top box device and/or in response to a predefined user input provided by way of a mobile device, management facility 106 may be configured to present a remaining portion of the movie on the mobile device, thereby allowing the corresponding user to continue viewing the movie on the mobile device at any desired location.

In additional or alternative examples, management facility 106 may be configured to allow a user to transfer a media content instance from a mobile device back to the media content access device and/or to an additional media content access device. For example, after transferring a media content instance (e.g., transferring a presentation and/or data representative of the media content instance) from a first media content access device to a mobile device, management facility 106 may be configured to transfer the media content instance back to the first media content access device and/or to a second media content access device. To illustrate, a user may selectively transfer a presentation of a television program being presented by a first set-top box device in a first room of the user's home to the user's mobile phone device, and then later selectively transfer the presentation of the television program from the mobile phone device to a second set-top box device in a second room (e.g., also within the user's home or at any other suitable location). Accordingly, the user's viewing experience may be substantially uninterrupted despite the user's need or desire to move from one location to another. To illustrate further, the same steps may allow the user to transfer a photograph from a first media content access device (e.g., a set-top box device) to a mobile device (e.g., for use as a background image on the mobile device) and/or then to a second media content access device (e.g., a personal computing device).

As mentioned above, management facility 106 may be configured to provide a user with access to enhanced content associated with an identified media content instance. Management facility 106 may be configured to provide access to the enhanced content in any suitable manner. For example, in response to a predefined user input provided by way of a mobile device during the presentation of a media content instance, management facility 106 may be configured to present an identified enhanced content instance on a display screen of the mobile device. To illustrate, during a presentation of a movie trailer by a television device, a user may utilize a tablet computer to provide a predefined user input, in response to which management facility 106 may display on a display screen of the tablet computer a webpage associated with the movie from the movie trailer. The user may then utilize the tablet computer to experience and/or interact with the webpage and/or any corresponding video clips, images, information, interactive content, etc.

Storage facility 108 may be configured to maintain media content data 110 representative of one or more media content instances and enhanced content data 112 representative of one or more enhanced content instances. Storage facility 108 may be configured to maintain additional or alternative data as may serve a particular implementation.

In some examples, one or more of facilities 102-108 may be user configurable. For example, a user may configure detection facility 102, identification facility 104, management facility 106, and/or storage facility 108 to operate in accordance with user preferences. To illustrate, in addition to or in the alternative of examples already disclosed herein, a user may configure identification facility 104 to utilize one or more user-preferred enhanced content sources when identifying enhanced content associated an identified media content instance. In further embodiments, a user may configure one or more of facilities 102-108 in any other suitable manner.

Figure 2:
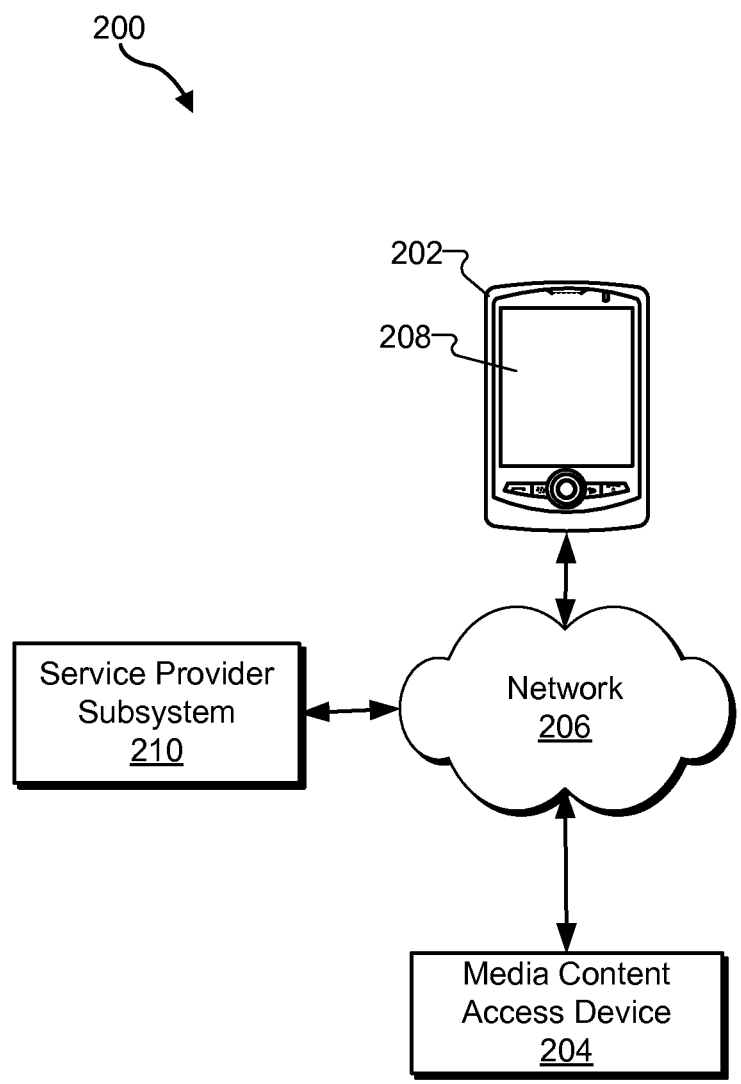
FIG. 2 illustrates an exemplary implementation of the system of FIG. 1 according to principles described herein.

FIG. 2 illustrates an exemplary implementation 200 of system 100. As shown, implementation 200 may include a mobile device 202 configured to communicate with a media content access device 204 by way of a network 206. Mobile device 202 may include any mobile computing device such as, but not limited to, a mobile phone, a smartphone, a personal digital assistant ("FDA"), a portable media player (e.g., an iPod or the like), a tablet computer (e.g., an iPad or the like), and/or any other suitable mobile device. As shown in FIG. 2, a display screen 208 may be included as part of mobile device 202. Display screen 208 may be configured to display any suitable content (e.g., media content and/or enhanced content) described herein.

Media content access device 204 may include, but is not limited to, a set-top box device, a digital video recording ("DVR") device, a multi-room DVR device, a media content processing device, a personal computer, a gaming device, a television device, and/or any device configured to facilitate access to one or more forms of media content.

Mobile device 202 and media content access device 204 may communicate using any suitable communication technologies, devices, networks, media, and/or protocols supportive of data communications. For example, mobile device 202 and media content access device 204 may communicate over network 206 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 206 may include one or more networks or types of networks (and communication links thereto) capable of carrying communications, media content, and/or data signals between mobile device 202 and media content access device 204. For example, network 206 may include, but is not limited to, one or more local area networks (e.g., a home Wi-Fi network), wireless data networks (e.g., a mobile phone voice or data network), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, public networks, private networks, packet-switched networks, and any other networks capable of carrying data and/or communications signals between mobile device 202 and media content access device 204. Communications between mobile device 202 and media content access device 204 may be transported using any one of the above-listed networks, or any combination or sub-combination of the above-listed networks.

While FIG. 2 shows mobile device 202 and media content access device 204 communicatively coupled via network 206, it will be recognized that mobile device 202 and media content access device 204 may be configured to communicate one with another in any other suitable manner (e.g., via an infrared connection).

FIG. 2 also shows that a service provider subsystem 210 may be communicatively coupled to mobile device 202 and/or media content access device 204 by way of network 206. Service provider subsystem 210 may include any number of components associated with one or more service providers (e.g., television service providers, media content providers, enhanced content sources, etc.) and may be configured to provide content (e.g., media content and/or enhanced content) and/or corresponding information (e.g., metadata) to media content access device 204 and/or mobile device 202 in any suitable manner.

The facilities of system 100 may be implemented by mobile device 202, media content access device 204, service provider subsystem 210, or any combination or sub-combination thereof. For example, mobile device 202 may be configured to execute one or more applications (or "apps") configured to facilitate performance of one or more of the content presentation processes described herein.

Figure 3:
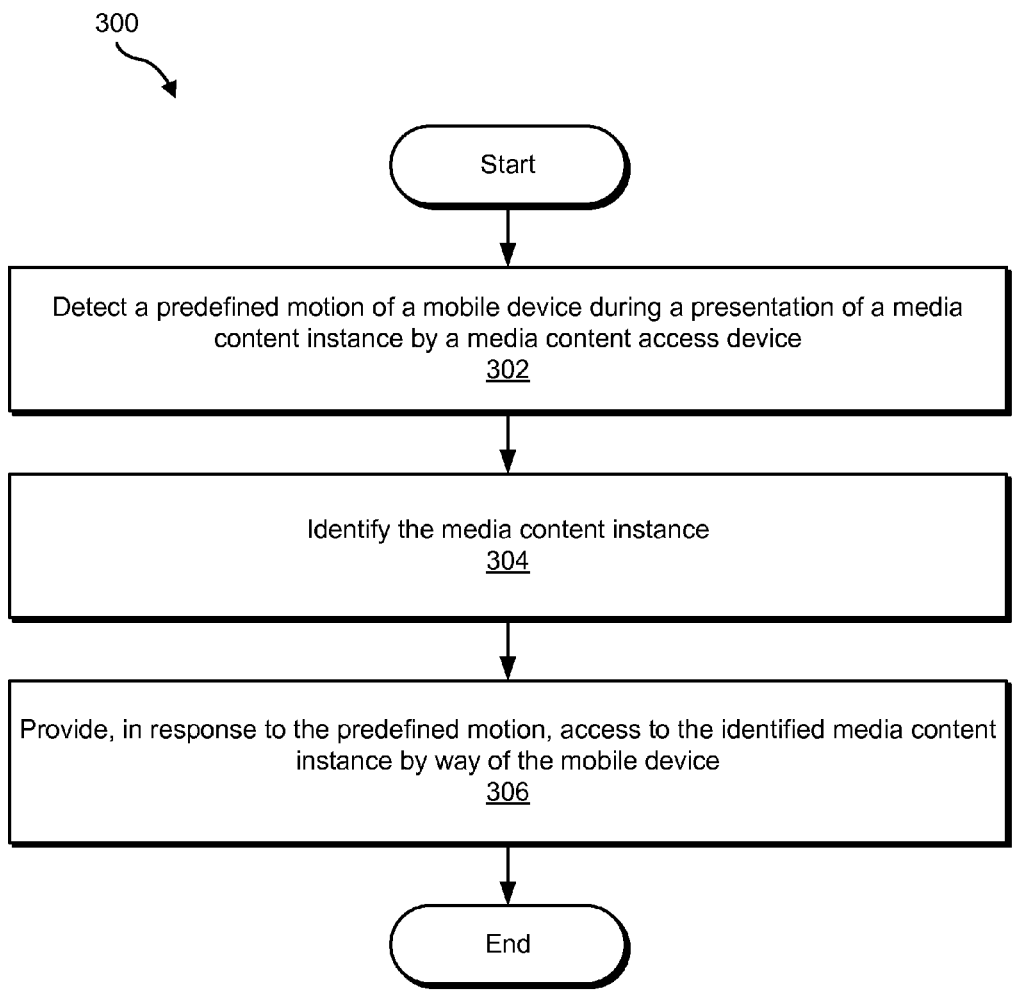
FIG. 3 illustrates an exemplary method for providing access to content during a presentation of a media content instance according to principles described herein.

FIG. 3 illustrates an exemplary method 300 of providing access to content during a presentation of a media content instance. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

In step 302, a content presentation system detects a predefined motion of a mobile device during a presentation of a media content instance by a media content access device. For example, detection facility 102 may be configured to detect a predefined motion of mobile device 202 during a presentation of a media content instance by media content access device 204. Detection facility 102 may be configured to detect the predefined motion in any suitable manner, such as disclosed herein.

In step 304, the content presentation system identifies the media content instance. For example, identification facility 104 may be configured to identify a media content instance being presented by media content access device 204. Identification facility 104 may be configured to identify the media content instance in any suitable manner, such as described herein.

In step 306, the content presentation system provides, in response to the predefined motion, access to the identified media content instance by way of the mobile device. For example, management facility 106 may be configured to provide, by way of mobile device 202, access to the media content instance being presented by media content access device 204 in response to the predefined motion of mobile device 202. Management facility 106 may be configured to provide access to the identified media content instance in any suitable manner, such as described herein.

Figure 4:
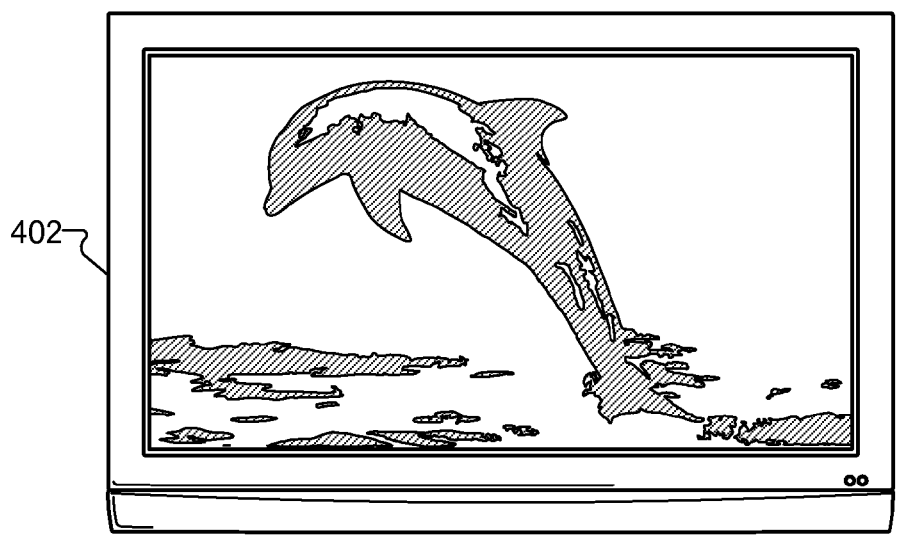
FIGS. 4-5 illustrate exemplary views of providing access to content during a presentation of a media content instance according to principles described herein.
Figure 4:
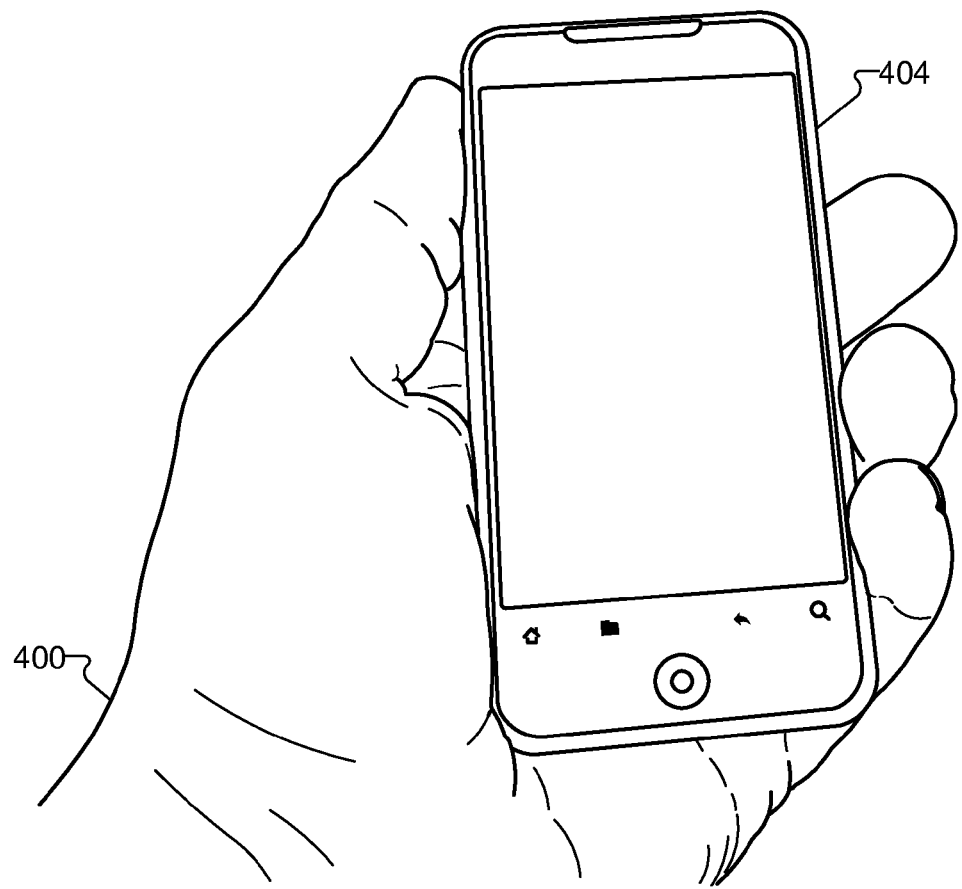
Figure 5:
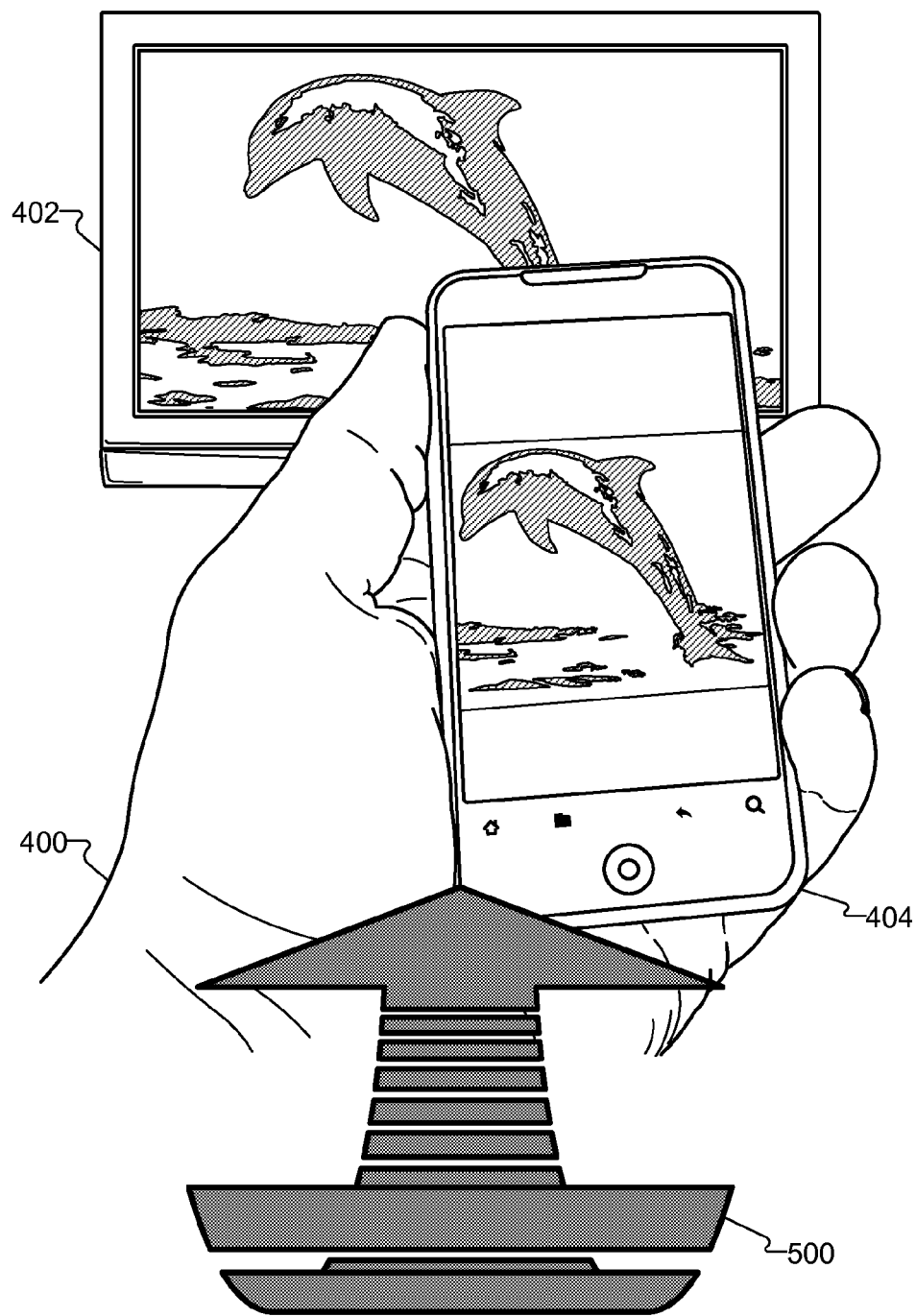

To illustrate the foregoing steps, FIGS. 4-5 illustrate views of an exemplary process of providing access to content during a presentation of a media content instance. As shown in FIG. 4, a user 400 may be viewing the presentation of a media content instance by a display device 402, which may include and/or be communicatively coupled to a media content access device. As further shown in FIG. 4, user 400 may be holding or otherwise have access to a mobile device 404.

As shown in FIG. 5, user 400 may utilize mobile device 404 to provide a predefined motion. In particular, user 400 may use mobile device 404 to make a scooping motion directed towards display device 402 during the presentation of the media content instance by display device 402. An exemplary scooping motion of mobile device 404 is depicted by arrow 500 in FIG. 5. Detection facility 102 may detect the scooping motion, and identification facility 104 may identify the media content instance being presented by display device 402. In response to the scooping motion, management facility 106 may provide user 400 with access to the identified media content instance by way of mobile device 404. For example, management facility 106 may be configured to direct display device 402, a corresponding media content access device, and/or a corresponding service provider to transmit data representative of the identified media content instance to mobile device 404. In some examples, management facility 106 may be configured to transfer the presentation of the media content access device to mobile device 404.

FIGS. 4-5 are provided for illustrative purposes only and are not limiting. One will appreciate that method 300 may be implemented in any other suitable manner, as may serve a particular implementation.

Figure 6:
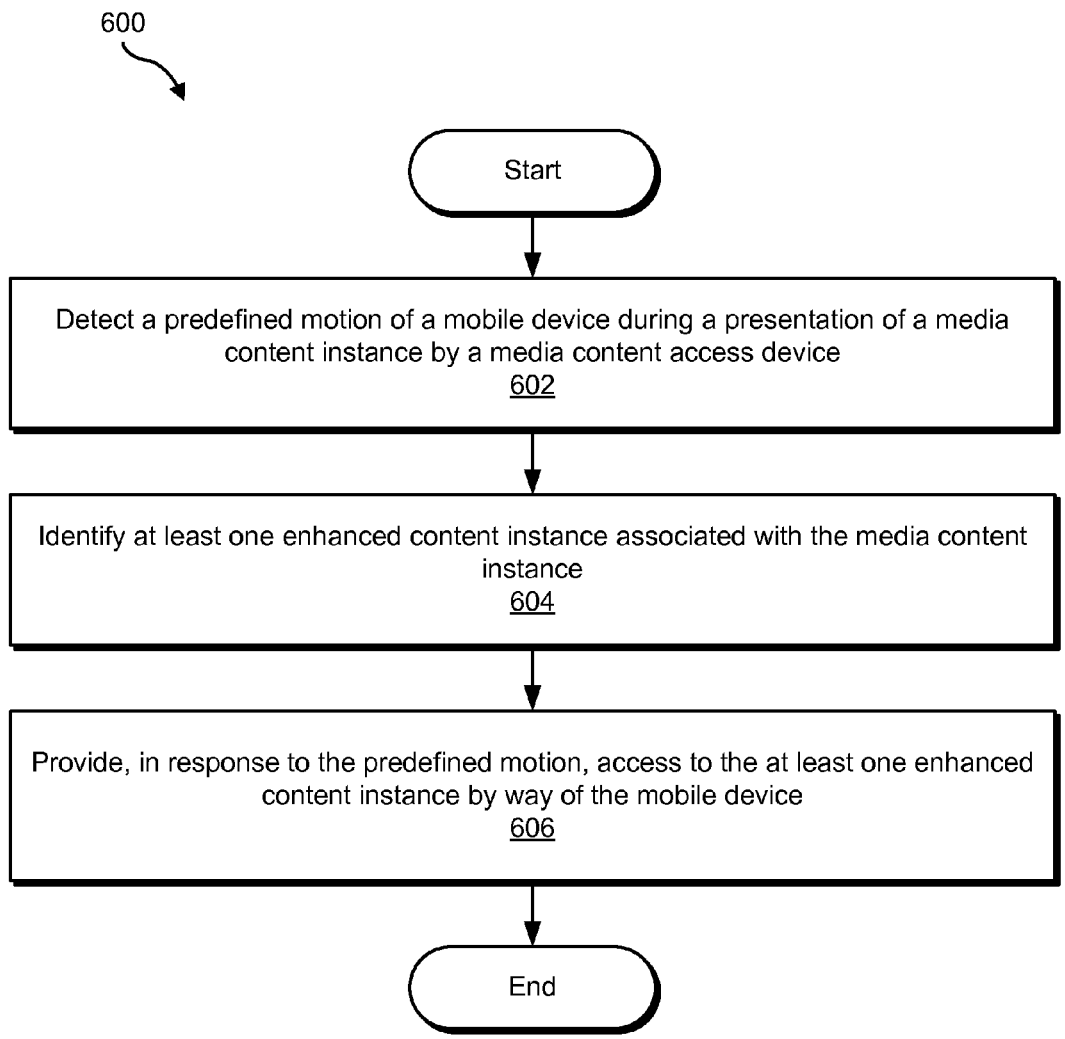
FIG. 6 illustrates another exemplary method for providing access to content during a presentation of a media content instance according to principles described herein.

FIG. 6 illustrates another exemplary method 600 of providing access to content during a presentation of a media content instance. While FIG. 6 illustrates exemplary steps according to one embodiment, other embodiments may omit, add to, reorder, and/or modify any of the steps shown in FIG. 6. One or more of the steps shown in FIG. 6 may be performed by any component or combination of components of system 100.

In step 602, a content presentation system detects a predefined motion of a mobile device during a presentation of a media content instance by a media content access device. For example, detection facility 102 may be configured to detect the predefined motion in any suitable manner, such as described herein.

In step 604, the content presentation system identifies at least one enhanced content instance associated with the media content instance. For example, identification facility 104 may be configured to identify the at least one enhanced content instance in any suitable manner, such as described herein.

In step 606, the content presentation system provides, in response to the predefined motion, access to the at least one enhanced content instance by way of the mobile device. For example, management facility 106 may be configured to provide access to the at least one enhanced content instance in any suitable manner, such as described herein.

Figure 7:
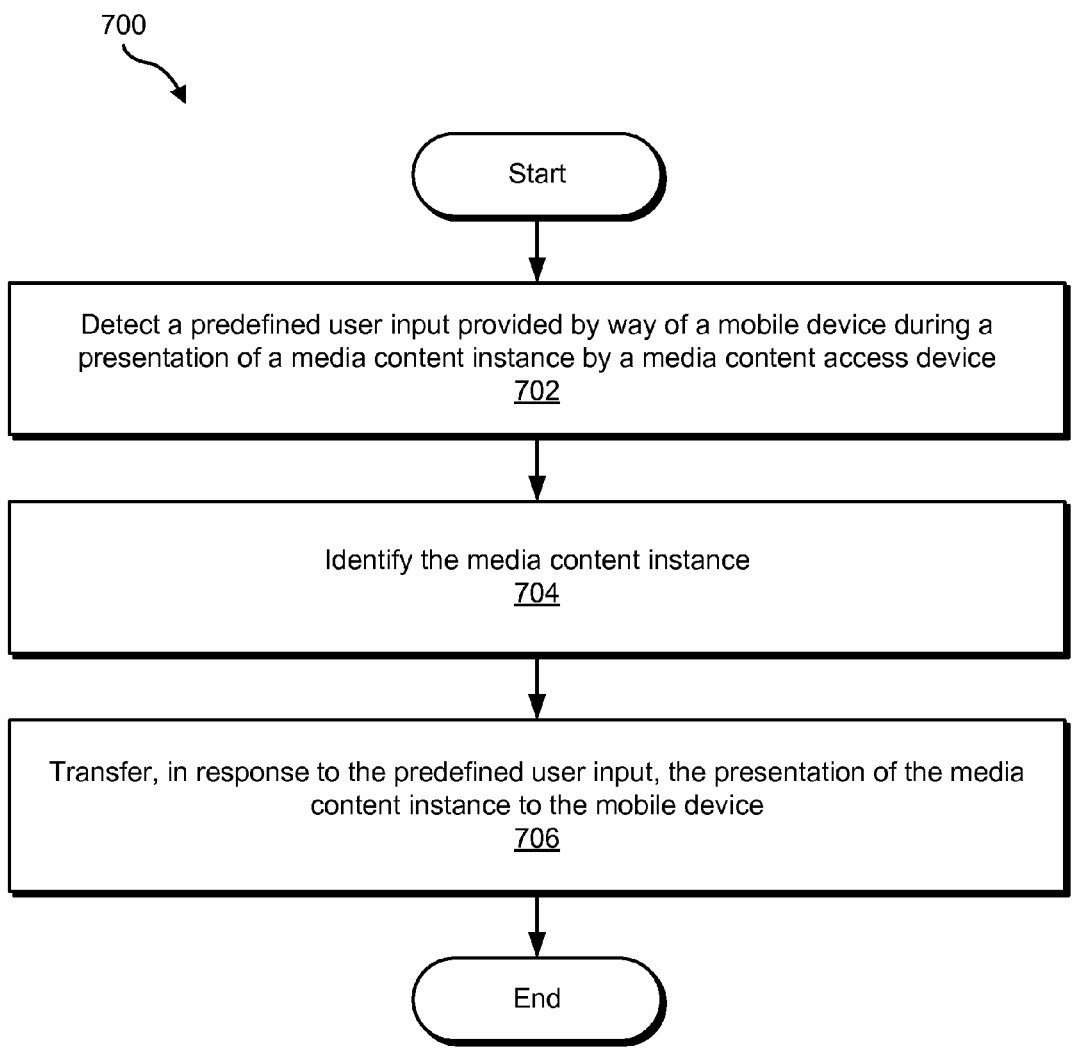
FIG. 7 illustrates another exemplary method for providing access to content during a presentation of a media content instance according to principles described herein.

FIG. 7 illustrates another exemplary method 700 of providing access to content during a presentation of a media content instance. While FIG. 7 illustrates exemplary steps according to one embodiment, other embodiments may omit, add to, reorder, and/or modify any of the steps shown in FIG. 7. One or more of the steps shown in FIG. 7 may be performed by any component or combination of components of system 100.

In step 702, a content presentation system detects a predefined user input provided by way of a mobile device during a presentation of a media content instance by a media content access device. For example, detection facility 102 may be configured to detect the predefined user input in any suitable manner, such as described herein.

In step 704, the content presentation system identifies the media content instance. For example, identification facility 104 may be configured to identify the media content instance in any suitable manner, such as described herein.

In step 706, the content presentation system transfers, in response to the predefined user input, the presentation of the media content instance to the mobile device. For example, management facility 106 may be configured to transfer the presentation of the media content instance to the mobile device in any suitable manner, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
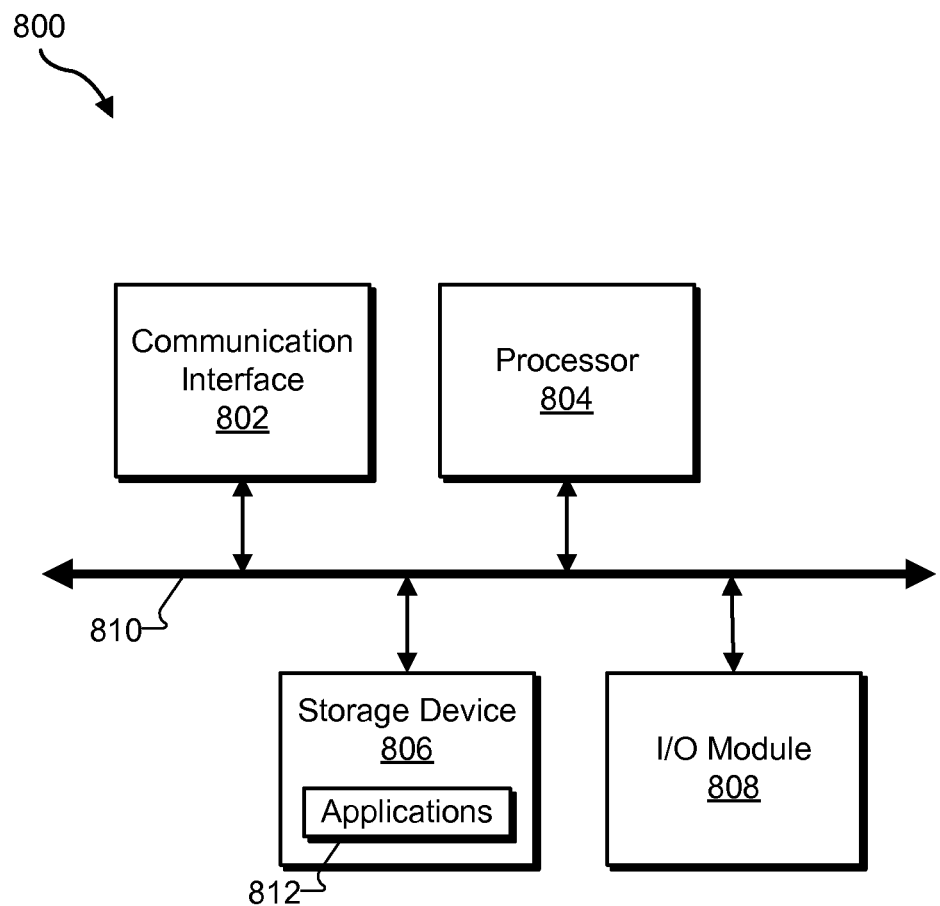
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. In at least one embodiment, communication interface 802 may provide a direct connection between system 100 and one or more provisioning systems via a direct link to a network, such as the Internet. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with detection facility 102, identification facility 104, and/or management facility 106. Likewise, storage facility 108 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a content presentation system, metadata associated with a media content instance being presented by a media content access device, wherein the metadata is received from at least one of the media content access device, a service provider associated with the media content instance, and a third-party metadata provider;
    identifying, by the content presentation system after receiving the metadata and in accordance with the received metadata, the media content instance;
    providing, by the content presentation system for presentation by a mobile device, an alert indicating that the media content instance being presented by the media content access device is available for access by the mobile device;
    detecting, by the content presentation system, a predefined motion of the mobile device during the presentation of the media content instance by the media content access device; and
    providing, by the content presentation system in response to the detecting of the predefined motion, access to the identified media content instance by way of the mobile device.

2. The method of claim 1, wherein the providing the access to the identified media content instance by way of the mobile device comprises transferring the presentation of the media content instance to the mobile device.

3. The method of claim 1, wherein the predefined motion comprises a scooping motion.

4. The method of claim 1, wherein the detecting the predefined motion comprises utilizing one or more motion sensors to detect the predefined motion.

5. The method of claim 4, wherein the one or more motion sensors comprise at least one of an accelerometer and a gyroscope included in the mobile device.

6. The method of claim 1, wherein the providing the access to the identified media content instance by way of the mobile device comprises directing a service provider associated with the media content instance to transmit data representative of the media content instance to the mobile device.

7. The method of claim 1, wherein the providing the access to the identified media content instance by way of the mobile device comprises directing the media content access device to transmit data representative of the media content instance to the mobile device.

8. The method of claim 1, wherein the detecting of the predefined motion occurs during a time period associated with the alert.

9. The method of claim 1, wherein the predefined motion is user configurable.

10. The method of claim 1, further comprising:
    detecting, by the content presentation system, a second predefined motion of the mobile device; and
    providing, by the content presentation system in response to the second predefined motion, access to the media content instance by way of an additional media content access device.

11. The method of claim 10, wherein the media content access device is located at a first location and the additional media content access device is located at a second location.

12. The method of claim 1, wherein the alert is provided for presentation by the mobile device during the presentation of the media content program.

13. The method of claim 1, wherein the providing of the alert for presentation by the mobile device is performed in response to the identifying of the media content instance.

14. A method comprising:
    receiving, by a content presentation system, metadata associated with a media content instance being presented by a media content access device, wherein the metadata is received from at least one of the media content access device, a service provider associated with the media content instance, and a third-party metadata provider;
    identifying, by the content presentation system after receiving the metadata and in accordance with the received metadata, at least one enhanced content instance associated with the media content instance;
    providing, by the content presentation system for presentation by a mobile device, an alert indicating that the at least one enhanced content instance associated with the media content instance is available for access by the mobile device;
    detecting, by the content presentation system, a predefined motion of the mobile device during the presentation of the media content instance by the media content access device;
    providing, by the content presentation system in response to the detecting of the predefined motion, access to the at least one enhanced content instance by way of the mobile device.

15. The method of claim 14, wherein the predefined motion comprises a scooping motion.

16. The method of claim 14, wherein the detecting the predefined motion comprises utilizing at least one of an accelerometer and a gyroscope included in the mobile device to detect the predefined motion.

17. The method of claim 14, wherein the providing the access to the at least one enhanced content instance by way of the mobile device comprises presenting the at least one enhanced content instance on a display screen associated with the mobile device.

18. The method of claim 14, wherein the providing the access to the at least one enhanced content instance by way of the mobile device comprises directing an enhanced content source associated with the at least one enhanced content instance to transmit data representative of the at least one enhanced content instance to the mobile device.

19. The method of claim 14, wherein the detecting of the predefined motion occurs during a time period associated with the alert.

20. The method of claim 14, wherein the identifying the at least one enhanced content instance comprises utilizing information associated with the media content instance to conduct one or more searches of one or more enhanced content sources.

21. The method of claim 20, wherein the information associated with the media content instance is included in the metadata associated with the media content instance.

22. A method comprising:
receiving, by a content presentation system, metadata associated with a media content instance being presented by a media content access device, wherein the metadata is received from at least one of the media content access device, a service provider associated with the media content instance, and a third-party metadata provider;
identifying, by the content presentation system after receiving the metadata and in accordance with the received metadata, the media content instance;
providing, by the content presentation system for presentation by a mobile device, an alert indicating that the media content instance being presented by the media content access device is available for access by the mobile device;
detecting, by the content presentation system, a predefined user input provided by way of the mobile device during the presentation of the media content instance by the media content access device, the predefined user input comprising a predefined motion of the mobile device; and
transferring, by the content presentation system in response to the detecting of the predefined user input, the presentation of the media content instance to the mobile device.

23. A system comprising:
an identification facility that
receives metadata associated with a media content instance being presented by a media content access device, wherein the metadata is received from at least one of the media content access device, a service provider associated with the media content instance, and a third-party metadata provider,
identifies, after the receipt of the metadata and based on the metadata, at least one of the media content instance and at least one enhanced content instance associated with the media content instance, and
provides, for presentation by a mobile device, an alert indicating that the media content instance or the at least one enhanced content instance associated with the media content instance is available for access by the mobile device,
a detection facility communicatively coupled to the identification facility and that detects a predefined motion of the mobile device during the presentation of the media content instance by the media content access device; and
a content management facility communicatively coupled to the identification facility and that provides, in response to the detecting of the predefined motion of the mobile device, access to the media content instance or the at least one enhanced content instance by way of the mobile device.

24. A system comprising:
an identification facility that
receives metadata associated with a media content instance being presented by a media content access device, wherein the metadata is received from at least one of the media content access device, a service provider associated with the media content instance, and a third-party metadata provider,
identifies, after receiving the metadata and in accordance with the metadata, the media content instance; and
provides, for presentation by a mobile device, an alert indicating that the media content instance is available for access by the mobile device,
a detection facility communicatively coupled to the identification facility and that detects a predefined user input provided by way of the mobile device during the presentation of the media content instance by the media content access device, the predefined user input comprising a predefined motion of the mobile device; and
a content management facility communicatively coupled to the identification facility and that transfers, in response to the detecting of the predefined user input, the presentation of the media content instance to the mobile device.

* * * * *